June 21, 1960 R. M. HATCH ET AL 2,942,210

WAVE-TRANSMISSION COUPLINGS

Filed Aug. 8, 1956 2 Sheets-Sheet 1

INVENTOR.
RICHARD M. HATCH
BY RICHARD RUBIN
Morton Amster
ATTORNEY

INVENTOR.
RICHARD M. HATCH
RICHARD RUBIN
BY
Morton Amster
ATTORNEY

United States Patent Office 2,942,210
Patented June 21, 1960

2,942,210

WAVE-TRANSMISSION COUPLINGS

Richard M. Hatch, West Concord, and Richard Rubin, Natick, Mass., assignors, by mesne assignments, to Sylvania Electric Products Inc., Wilmington, Del., a corporation of Delaware Filed Aug. 8, 1956, Ser. No. 602,870

9 Claims. (Cl. 333—26)

The present invention relates to the transmission of short-wave radio signals, and in particular this invention relates to a type of coupling network known as a "balun." These are transmission networks which couple a single unbalanced line to a pair of balanced lines, or to two lines in which the radio waves are 180° out of phase with each other.

Broadly the object of the present invention is to provide a novel form of balun. More specifically, this invention provides a novel balun having broad-band characteristics, without need for complications of design and adjustment that characterize baluns of usual construction. In another aspect, the present invention provides a novel balun which avoids critical dimensions and proportions to match the particular wave-length to be transmitted. The principle of the novel baluns provided by the present invention renders unnecessary the use of one or more tuning stubs for broadband operation, which tend to complicate known forms of baluns and to render their adjustment difficult and critical.

In achieving the foregoing objects there are disclosed below two illustrative embodiments of the invention wherein a single-ended coupling at one end of a transmission network extends by way of two parallel paths to a balanced pair of coupling devices at another part of the network. The pair of transmission paths are exactly equal in length, and they extend in opposite directions from each coupling device toward the other. The single-ended coupling may receive the input signal and the pair of couplings may deliver the output in some applications; in other applications the single-ended coupling may be the output coupling and the pair of couplings may serve as signal input means; and in still other applications both input and output may appear at each of the couplings for transmission through the network in opposite directions.

The nature of the invention and further details and features thereof will become clear from the following detailed description of the novel embodiments illustrated in the accompanying drawings which form part of this disclosure. In the accompanying drawings.

Figure 1:
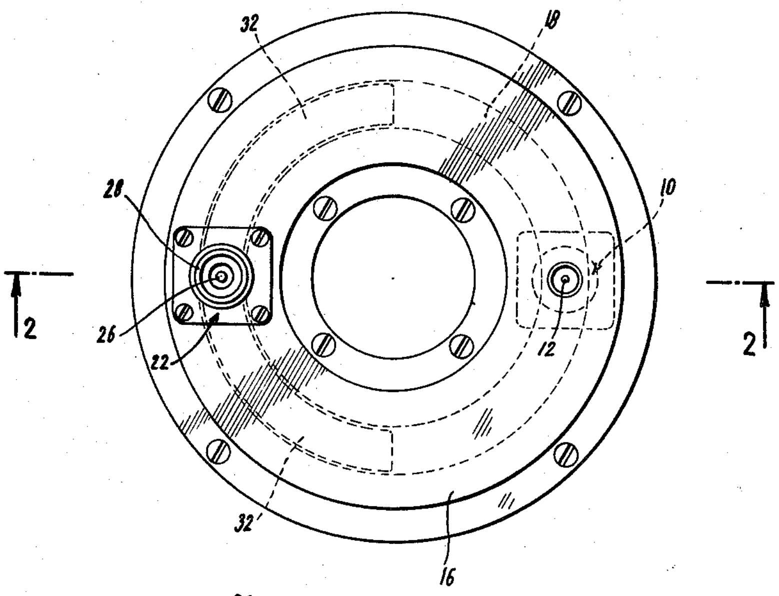
Fig. 1 is a plan view of an embodiment of the invention.
Figure 2:
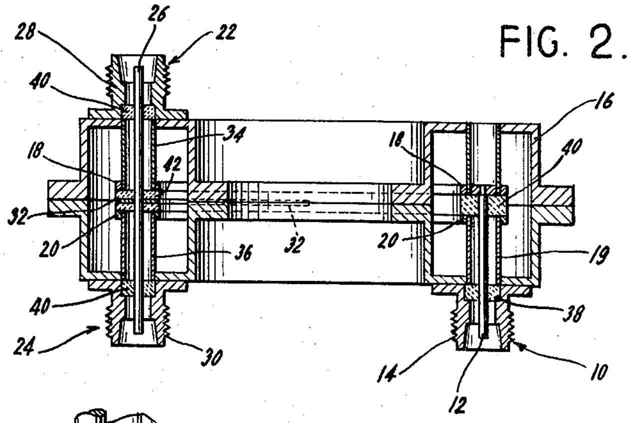
Fig. 2 is a transverse cross section of the device along the line 2—2 in Fig. 1.
Figure 3:
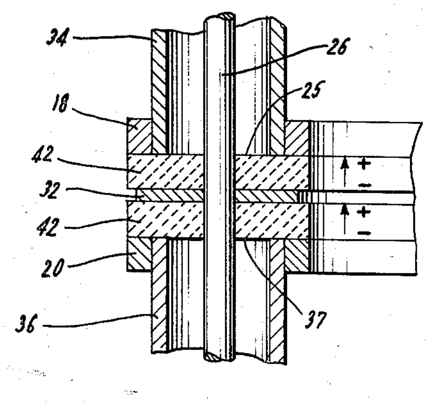
Fig. 3 is an enlarged detail of the left hand portion of the device in Fig. 2.

Referring now to the drawings and in particular to Figs. 1 to 3 inclusive, there is shown a novel balun. The single-ended coaxial coupling 10, including an inner conductor 12 and an outer conductor 14, is found at the right hand side of a hollow, metal toroid 16. Outer conductor 14 is mounted on the hollow toroid. This toroid encloses a pair of metal rings 18 and 20 that are insulated apart and together act as a parallel-wire transmission line closed upon itself in the form of a ring. Coupling to this transmission line ring is made by inner conductor 12 which is joined to the top ring 18 and by the outer conductor 14 via tube 19 to the lower ring 20. The lower ring 20 has an opening providing for passage of energy from coaxial line 12, 14 to transmission line rings 18, 20.

Diametrically opposite coaxial coupling 10 and coupled to the two-path closed-loop transmission line 18, 20 are oppositely directed, coaxially arranged coaxial couplings 22 and 24. These include a common inner conductor 26 and respective outer conductors 28 and 30. At a point midway between conductors 18 and 20, conductor 26 is joined to a metal septum 32 which extends in opposite directions from conductor 26 along rings 18 and 20, as indicated by the dotted lines in Fig. 1. The septum is mounted midway between rings 18 and 20. Outer conductors 28 and 30 of the aligned oppositely directed couplings 22 and 24 are joined to the wall of hollow conductor 16, and are connected to the top and bottom conductors 18 and 20 of the parallel-strip transmission line via tubes 34 and 36. Both rings 18 and 20 have holes 35 and 37 furnishing paths from the space between those rings to the transmission space in the couplings 22 and 24.

Suitable rings 38 of insulation of a low-loss dielectric are provided for separating the inner conductors from the outer conductors of the couplings 10, 22 and 24, and further insulating rings 40 and 42 are provided, which not only locate the inner conductors of the coaxial couplings but in addition separate the upper and lower conductors 18 and 20 from each other and fix the septum 32 in position midway between those parallel-line conductors 18 and 20.

As seen in Fig. 1 the rings 18 and 20 provide a closed-loop transmission path which interconnects the single coaxial coupling 10 and the pair of coaxial couplings 22 and 24. Coupling 10 is connected to the pair of couplings 22, 24 by two transmission lines which are electrically in parallel, these paths being formed by the two halves of the transmission line ring. The transmission line composed of two parallel conductors extends in opposite directions from coupling 10. The transmission paths also extend in opposite directions from couplings 22 and 24. The conductors of the coaxial couplings are seen to extend at right angles to the planes of rings 18, 20.

It is apparent that the radial electric field developed between the inner and the outer conductors of the coupling device 10 is coupled to rings 18 and 20, and is there transformed into a field having potential lines extending vertically between the top and bottom ring conductors. The same vertical potential pattern exists in the region of septum 32. This is represented by the vertical arrows appearing in Fig. 3, which is an enlarged detail of the device in Fig. 2. The electric field is assumed to be positive in the direction of the arrowheads. This establishes the top conductor 18 as positive, and in relation to that top conductor, septum 32 is negative. The septum, in turn, is positive in relation to the lower conductor 20 of the parallel-strip transmission line.

It has been noted that the energy which appears at coupling 10 is transmitted by way of two parallel paths. For impedance matching each path is arranged to have twice the characteristic impedance of single-ended coaxial coupling 10. Likewise the characteristic impedance of the coaxial lines represented by couplings 22 and 24 is one-quarter the characteristic impedance of each path of the transmission line, and, in turn, couplings 22 and 24 have one half the characteristic impedance of coupling 10. Thus, a 100 ohm transmission line connected at coaxial coupling 10 would feed into a pair of 50 ohm transmission lines connected at couplings 22 and 24. Each path provided by parallel-strip transmission lines 18, 20 should be designed to have a characteristic impedance of 200 ohms in this example. The characteristic impedance of line 18, 20 can be varied along its length, where it is desired to match other input and output impedances (by varying the conductor width or spacing or both), so as that the term "parallel-strip" transmission line is not to be interpreted narrowly.

The device in Figs. 1 and 2 is shown approximately according to scale, and from this it can be seen that, while the dimensions of the couplings are small in relation to the length of the transmission paths which interconnect those couplings, there is no critical proportioning of the length of transmission paths in relation to the wave length of energy which is transmitted between them. Hollow conductor 16 is made large compared to the separation between the conductors 18 and 20, to provide a shielded space for the fringing field which inevitably exists at the edges of the conductors 18, 20.

Figure 4:
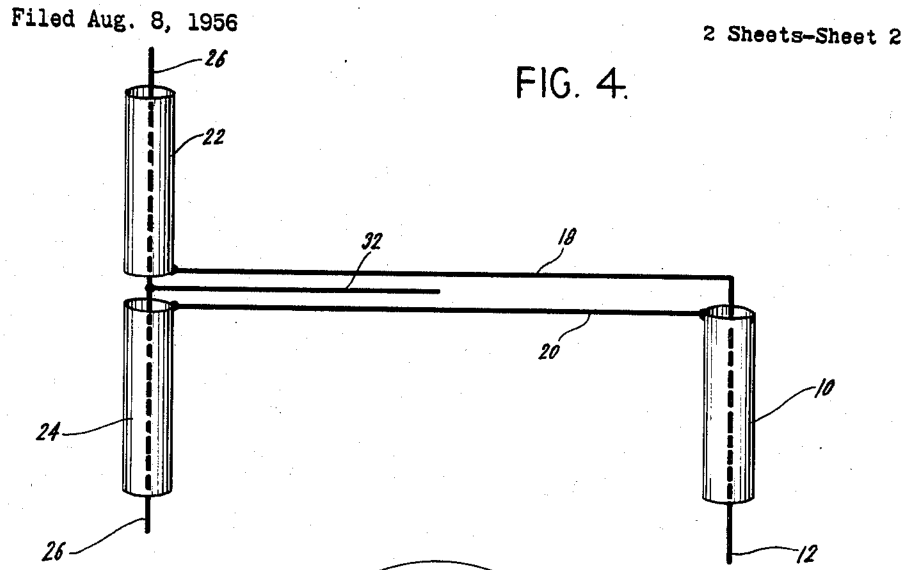
Fig. 4 is a diagrammatic representation of the device in Figs. 1 to 3 inclusive.

In Fig. 4 the couplings 10, 22 and 24 are shown interconnected by conductors 18 and 20, only one of the two parallel paths being there illustrated. Coupling 10 may be the input coupling and in that event the unbalanced input would be coupled to the 180° phase-opposed output couplings 22 and 24. In this connection, the two halves of a dipole antenna may be energized. Reverse operation is also obviously feasible.

It is apparent that the device in Figs. 1 to 4 involves a network which does not depend upon any tuning stubs or critical transmission paths related to the wave lengths being transmitted. Consequently this network in concept, should be of indefinitely great band width. The ideal impedance ratio between the single input and one of the balanced outputs is 2:1. In practice a ratio which is within factor of 1.4 of being 2:1 is attainable over a frequency range of at least 3.5 to 1.

It has been noted that the balun described requires no quarter wave or half wave tuning stubs. This not only eliminates the need for adjusting or tuning such stubs, but it also has the advantage of enabling the designer to more freely choose his desired operating impedances.

Figure 5:
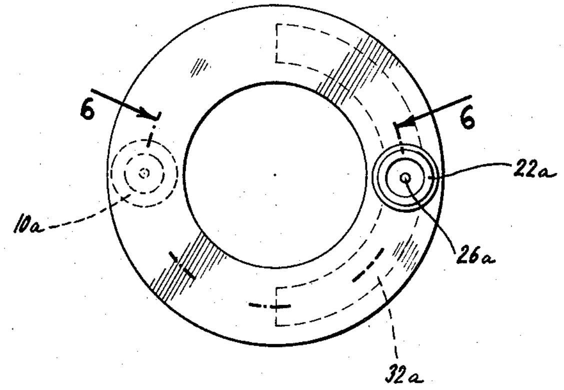
Fig. 5 is the plan view of the modification of the device in Figs. 1 to 4 inclusive.
Figure 6:
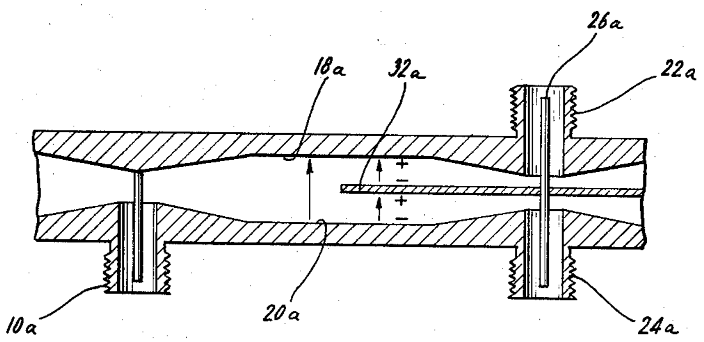
Fig. 6 is a cross section, in the nature of a development, along the line 6—6 in Fig. 5.

The balun in Figs. 1 to 4 employs a closed-loop transmission line embodying two electrically parallel paths. The form there illustrated is circular, with conductors 18 and 20 in the form of flat rings, one above the other and coaxial. The axes of the coupling devices 10, 22 and 24 are all parallel. It is entirely within the contemplation of the present invention that other forms of transmission guide means be substituted for the parallel-strip transmission line represented in Figs. 1 to 4 inclusive. Another form of balun embodying the broad features of the present invention is illustrated in Figs. 5 and 6 wherein the parallel-line transmission path is replaced by a wave guide. In Fig. 5, an annular or toroidal wave guide is shown which couples the single-ended coaxial coupling **10*a* to the opposed pair of coaxially aligned balanced coaxial couplings 22*a* and 24*a*. In Fig. 6 this is illustrated in a developmental section taken along one of the parallel transmission paths between the single coupling and the pair of couplings involved. In this developmental section, the wave guide includes an upper conductor 18*a* and a lower conductor 20*a* which correspond to the upper and lower conductors 18 and 20 of the parallel-strip transmission line of the device in Figs. 1 to 4. The septum 32*a* is shown connected to the common connector 26*a* of the pair of oppositely phased coupling devices 22*a* and 24*a***. The guide dimensions and configuration are chosen so that the $TE_{01}$ mode will be excited.

The device of Figs. 5 and 6 will be recognized as having the same geometric relationships between the couplings and the transmission paths as those in the balun of Figs. 1 to 4. The hollow conductor 16 of Figs. 1 to 4 has been omitted in the device of Figs. 5 and 6 or, from another point of view, has been incorporated in the closed-loop wave guide **18*a*, 20*a*. In the embodiment of Figs. 5 and 6, a tapered transition is provided between each coaxial coupling device 10*a* and the dual coupling 22*a*, 24*a* to the transmission path 18*a*, 20*a***; and this gradual transition or impedance change is of advantage in minimizing mismatch and reflections.

The embodiments of Figs. 1 to 4 and Figs. 5 and 6 include respective septums 32 and **32*a***. These are not essential structures in either embodiment but they help to demonstrate the impedance ratios and field patterns described above.

What we claim is:

1. A balun comprising a conductive structure of toroidal shape including first and second spaced apart confronting surfaces defining a closed-loop wave transmission guide, a single coaxial coupling having an outer conductor connected to said first surface and an inner conductor connected to said second surface, a pair of aligned coaxial couplings having the respective outer conductors thereof connected to said first and second surfaces, respectively, and having a common inner conductor extending across the space between said confronting surfaces and insulated therefrom, said pair of coaxial couplings being joined to said toroidal structure at a point diametrically opposite said single coupling, said coaxial couplings having axes parallel to each other and to the axis of said toroidal structure.

2. A balun in accordance with claim 1 and further including a conductive septum electrically connected to said common inner conductor and positioned intermediate said first and second surfaces and parallel thereto, said septum extending for equal distances and in opposite directions from said common inner conductor toward said single coupling.

3. A balun in accordance with claim 1 wherein said conductive structure includes a pair of coaxial, parallel, spaced apart rings defining a parallel-strip transmission line.

4. A balun in accordance with claim 1 wherein said conductive structure includes a pair of coaxial, parallel, spaced apart rings defining a parallel-strip transmission line, and a toroidal hollow conductor defining a cavity enclosing said rings.

5. A balun in accordance with claim 1 wherein said conductive structure comprises first and second annular members constructed and arranged to define an annular hollow waveguide of generally rectangular cross-section.

6. A balun comprising a conductive structure including first and second spaced apart confronting surfaces defining a closed-loop wave transmission guide, a single coaxial coupling having an outer conductor connected to said first surface and an inner conductor connected to said second surface, a pair of coaxial couplings having the respective outer conductors thereof connected to said first and second surfaces, respectively, and having a common inner conductor extending across the space between said confronting surfaces and insulating therefrom, said pair of coaxial couplings being joined to said closed-loop wave transmission guide at a point where the electrical distances to said single coaxial coupling from said point in either direction along said closed-loop guide are equal.

7. A balun in accordance with claim 6 and further including a conductive septum connected to said common inner conductor and positioned intermediate said first and second surfaces and parallel thereto, said septum extending for equal distances and in opposite directions from said common inner conductor toward said single coupling.

8. A balun in accordance with claim 7 wherein said conductive structure includes spaced apart members defining a parallel-strip transmission line.

9. A balun, including first and second coaxial spaced apart conductive rings constituting a closed-loop transmission line, a single coaxial coupling having an outer conductor joined to the first of said rings and an inner conductor connected to the other of said rings, a coaxial pair of coaxial couplings having the respective outer conductors thereof joined to said first and second rings, respectively, at a point diametrically opposite said single coupling, said coaxial couplings having axes parallel to each other and to the axis of said rings.

References Cited in the file of this patent

UNITED STATES PATENTS

| | | |
|---|---|---|
| 2,410,838 | Ring | Nov. 12, 1946 |
| 2,417,542 | Carter | Mar. 18, 1947 |
| 2,507,712 | Harrison | May 16, 1950 |
| 2,527,910 | Braden | Oct. 1, 1950 |
| 2,543,085 | Willoughby | Feb. 27, 1951 |
| 2,580,389 | Anderson | Jan. 1, 1952 |